United States Patent
Wu et al.

(10) Patent No.: US 12,068,797 B2
(45) Date of Patent: Aug. 20, 2024

(54) RADIO INTERFERENCE DETECTION METHOD AND DEVICE

(71) Applicant: Huawei Technologies Co., Ltd., Shenzhen (CN)

(72) Inventors: Xing Wu, Chengdu (CN); Ying Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 464 days.

(21) Appl. No.: 17/284,405

(22) PCT Filed: Oct. 11, 2018

(86) PCT No.: PCT/CN2018/109874
§ 371 (c)(1),
(2) Date: Apr. 9, 2021

(87) PCT Pub. No.: WO2020/073284
PCT Pub. Date: Apr. 16, 2020

(65) Prior Publication Data
US 2021/0384993 A1    Dec. 9, 2021

(51) Int. Cl.
*H04B 17/336*   (2015.01)
*H04B 17/318*   (2015.01)
*H04W 72/0453*   (2023.01)

(52) U.S. Cl.
CPC ......... *H04B 17/336* (2015.01); *H04B 17/318* (2015.01); *H04W 72/0453* (2013.01)

(58) Field of Classification Search
CPC .......................... H04B 17/336; H04W 72/0453
See application file for complete search history.

(56) References Cited

U.S. PATENT DOCUMENTS 6,128,494 A * 10/2000 Rozmaryn ............ H04W 36/30
455/436
2003/0207696 A1* 11/2003 Willenegger ......... H04L 1/0002
370/347
(Continued)

FOREIGN PATENT DOCUMENTS

CN   101572903 A   11/2009
CN   105101283 A   11/2015
(Continued)

*Primary Examiner* — Brenda H Pham
(74) *Attorney, Agent, or Firm* — Leydig, Voit & Mayer, Ltd.

(57) ABSTRACT

This application provides a radio interference detection method and an apparatus. The method includes: obtaining an available frequency configured for a current cell; measuring signal information of a signal received on the available frequency; and determining, based on the signal information of the signal, whether there is radio interference. The available frequency is obtained based on information about a broadcast channel, and signal strength of the available frequency of the current cell is preferentially scanned, to determine whether there is radio interference. If there is interference on the available frequency of the current cell, corresponding processing can be performed quickly. According to the application, because a relatively small quantity of frequencies are scanned preferentially, an effective interference detection speed can be increased quickly.

20 Claims, 12 Drawing Sheets

(56) References Cited

U.S. PATENT DOCUMENTS

| | | | |
|---|---|---|---|
| 2006/0116081 A1* | 6/2006 | Shah | H04B 17/345 |
| | | | 455/67.11 |
| 2014/0206341 A1 | 7/2014 | Siomina et al. | |
| 2016/0309356 A1 | 10/2016 | Madan et al. | |
| 2017/0085326 A1 | 3/2017 | Li et al. | |

FOREIGN PATENT DOCUMENTS

| | | | |
|---|---|---|---|
| CN | 105228199 A | 1/2016 | |
| CN | 107211428 A | 9/2017 | |
| CN | 108153321 A | 6/2018 | |
| WO | 2016123025 A1 | 8/2016 | |

\* cited by examiner

| Test information | Interference strength | | | | |
|---|---|---|---|---|---|
| | Maximum interference | | | | |
| | | | | | |
| Test environment | Frequency band & frequency | Quantity of tests | Time from when an interferometer is started to when reporting is performed (JAMMED)-- a network is disconnected at the same time | Time from when an interferometer is turned off to when exiting is reported (DETECTING)-- a network is registered at the same time | |
| GSM | GSN1800 Feeder 408 | 1 | 11s | 11s | 10s |
| | | 2 | 9s | 7s | 25s |
| | | 3 | 9s | 8s | 10s |
| | | 4 | 13s | 4s | 15s |
| | | 5 | 9s | 8s | 16s |
| | | 6 | 9s | 6s | 12s |
| | | 7 | 9s | 12s | 12s |
| | | 8 | 9s | 5s | 16s |
| | | 9 | 8s | 17s | 6s |
| | | 10 | 9s | 24s | 15s |
| | | 11 | 10s | 9s | |
| | | 12 | 9s | 2s | |

FIG. 2

| Test information | Interference strength | Interferometer model | | | |
|---|---|---|---|---|---|
| | Maximum interference at a time | (2G+3G+4G) | | | |
| Test environment | Frequency band & frequency & signal strength | Quantity of tests | Time (s) from when an interferometer is started to when a network is disconnected | Time from when an interferometer is started to when interference is reported (^JDINFO:1,2) | Time from when an interferometer is turned off to when exiting is reported (^JDINFO:0,2)-- a network is registered at the same time |
| LTE | Laboratory network B38 (25850) RSRP -95dbm | 1 | 10 | 18 | 6 |
| | | 2 | 9 | 17 | 3 |
| | | 3 | 9 | 17 | 14 |
| | | 4 | 8 | 16 | 11 |
| | | 5 | 8 | 16 | 16 |
| | | 6 | 7 | 16 | 16 |
| | | 7 | 9 | 17 | 3 |
| | | 8 | 9 | 17 | 11 |
| | | 9 | 7 | 15 | 19 |
| | | 10 | 9 | 17 | 3 |
| | | Average value of 10 tests | 8.5s | 16.6 | 10.2 |

FIG. 3

RADIO INTERFERENCE DETECTION METHOD AND DEVICE

CROSS-REFERENCE TO RELATED APPLICATION

This application is a national stage of International Application No. PCT/CN2018/109874, filed on Oct. 11, 2018, which is hereby incorporated by reference in its entirety.

TECHNICAL FIELD

Embodiments of this application relate to the communications field, and in particular, to a radio interference detection method and device.

BACKGROUND

With the development of the society, the internet of vehicles gradually gains popularity, and more automobile manufacturers connect vehicles to the internet of vehicles, to improve security of the vehicles. Currently, most high-end vehicles have been equipped with an on-line anti-theft alarm system, so that global wireless communication can be performed through internet, and vehicle information and a security problem can be learned at any time, thereby reducing theft risks of the vehicles. When a vehicle encounters some alarm statuses, a security service center and a vehicle owner can be notified through short message service message, ECALL, or the like within seconds. However, sometimes, when stealing a vehicle, a vehicle stealer interferes with a downlink operating frequency band of a vehicle-mounted wireless network device by using an interferometer. Therefore, to avoid a case in which a vehicle cannot send alarm information to a background server or a vehicle owner due to interruption of communication between a wireless network device and a base station, the vehicle-mounted wireless network device on the vehicle needs to be capable of detecting radio interference and sending a report to an in-vehicle system, and the in-vehicle system performs local alarming or performing other protective measures.

In some solutions, all frequencies in a corresponding network standard are scanned to determine whether there is radio interference. As a result, a detection process consumes a relatively long time, and this does not help to send a report to an in-vehicle system in time.

SUMMARY

Embodiments of this application provide a radio interference detection method and device, to improve a signal strength and quality measurement method. An available frequency of a cell is detected, so that scanning of an unnecessary frequency or frequency band is reduced, and detection is accelerated, thereby increasing a detection speed.

According to a first aspect, this application provides a radio interference detection method. The method includes: obtaining an available frequency configured for a current cell; measuring signal information of a signal received on the available frequency; and determining, based on the signal information of the signal, whether there is radio interference.

In a possible implementation, the signal information includes signal strength or a signal-to-noise ratio.

In a possible implementation, the determining, based on the signal information of the signal, whether there is radio interference includes: when the signal information of the signal is greater than a first information threshold, adding 1 to a first parameter, and determining whether the first parameter is greater than a first parameter threshold, where the first parameter records a quantity of times that the signal information of the signal is greater than the first information threshold, and an initial value of the first parameter is 0; and when the first parameter is greater than the first parameter threshold, determining that there is radio interference.

In a possible implementation, when the first parameter is not greater than the first parameter threshold, the signal information of the signal received on the available frequency is measured.

In a possible implementation, the method further includes: when the signal information of the signal is not greater than the first information threshold, measuring signal information of all available frequencies in all network standards; collecting statistics on a quantity k of available frequencies with signal information being greater than a second information threshold; determining whether a ratio of k to a total quantity of frequency channel numbers in global system for mobile communications is greater than a ratio threshold; and when the ratio of k to the total quantity of frequencies in all the network standards is greater than the ratio threshold, determining that there is radio interference.

In a possible implementation, when the ratio of k to the total quantity of frequencies in all the network standards is not greater than the ratio threshold, it is determined that there is no radio interference.

In a possible implementation, the obtaining an available frequency configured for a current cell includes: measuring signal information of a broadcast control channel of the current cell; and when the signal information of the broadcast control channel is not greater than a third information threshold or a network status is a connected state, obtaining, from the broadcast control channel of the current cell, the available frequency configured for the current cell.

In a possible implementation, the method further includes: when the signal information of the broadcast control channel is greater than the third information threshold and the network status is a disconnected state, adding 1 to a second parameter, and determining whether the second parameter is greater than a second parameter threshold, where the second parameter records a quantity of times that the signal information of the broadcast control channel is greater than the third information threshold and the network status is the disconnected state, and an initial value of the second parameter is 0; and when the second parameter is greater than the second parameter threshold, determining that there is radio interference on the broadcast control channel.

In a possible implementation, when the second parameter is not greater than the second parameter threshold, the signal information of the broadcast control channel of the current cell is measured.

According to a second aspect, this application provides a radio interference detection apparatus, including: an obtaining module, configured to obtain an available frequency configured for a current cell; a measurement module, configured to measure signal information of a signal received on the available frequency; and a determining module, configured to determine, based on the signal information of the signal, whether there is radio interference.

In a possible implementation, the signal information includes signal strength or a signal-to-noise ratio.

In a possible implementation, the determining module is configured to: when the signal information of the signal is greater than a first information threshold, automatically add 1 to a first parameter, and determine whether the first parameter is greater than a first parameter threshold, where the first parameter records a quantity of times that the signal information of the signal is greater than the first information threshold, and an initial value of the first parameter is 0; and when the first parameter is greater than the first parameter threshold, determine that there is radio interference.

In a possible implementation, the determining module is further configured to: when the first parameter is not greater than the first parameter threshold, the measurement module continues to measure the signal information of the signal received on the available frequency.

In a possible implementation, the measurement module is further configured to: when the signal information of the signal is not greater than the first information threshold, measure signal information of all available frequencies in all network standards; and the determining module is further configured to: collect statistics on a quantity k of available frequencies with signal information being greater than a second information threshold; determine whether a ratio of k to a total quantity of frequencies in all the network standards is greater than a ratio threshold; and when the ratio of k to the total quantity of frequencies in all the network standards is greater than the ratio threshold, determine that there is radio interference.

In a possible implementation, the determining module is further configured to: when the ratio of k to the total quantity of frequencies in all the network standards is not greater than the ratio threshold, determine that there is no radio interference.

In a possible implementation, the measurement module is further configured to measure signal information of a broadcast control channel of the current cell; and the determining module is further configured to: when the signal information of the broadcast control channel is not greater than a third information threshold or a network status is a connected state, obtain, from the broadcast control channel of the current cell, the available frequency configured for the current cell.

In a possible implementation, the determining module is further configured to: when the signal information of the broadcast control channel is greater than the third information threshold and the network status is a disconnected state, automatically add 1 to a second parameter, and determine whether the second parameter is greater than a second parameter threshold, where the second parameter records a quantity of times that the signal information of the broadcast control channel is greater than the third information threshold and the network status is the disconnected state, and an initial value of the second parameter is 0; and when the second parameter is greater than the second parameter threshold, determine that there is radio interference on the broadcast control channel.

In a possible implementation, the determining module is further configured to: when the second parameter is not greater than the second parameter threshold, measure the signal information of the broadcast control channel of the current cell.

According to a third aspect, this application provides a computer readable storage medium, including an instruction. When the instruction is run on a computer, the computer is enabled to perform the method in any one of the first aspect and the possible implementations.

According to a fourth aspect, this application provides a computer program product including an instruction. When the computer program product runs on a computer, the computer is enabled to perform the method in any one of the first aspect and the possible implementations.

In the radio interference detection method and device provided in this application, an available frequency is obtained by using information about a broadcast channel, signal strength of the available frequency of the current cell is scanned preferentially to determine whether there is radio interference, and if there is interference on the available frequency of the current cell, corresponding processing can be performed quickly. Because a relatively small quantity of frequencies are scanned preferentially, an effective interference detection speed can be increased quickly.

BRIEF DESCRIPTION OF DRAWINGS

FIG. 2 is a schematic diagram of response duration of FIG. 1 in global system for mobile communications;

FIG. 3 is a schematic diagram of response duration of FIG. 1 in a long term evolution technology;

DESCRIPTION OF EMBODIMENTS

The following describes the technical solutions in the embodiments of this application with reference to the accompanying drawings in the embodiments of this application.

This application may be applied to a vehicle alarming scenario. When a vehicle is not used, the vehicle usually is parked on a place away from a vehicle owner such as a parking lot or the roadside. In this case, there is a theft risk of the vehicle. When the vehicle is stolen, an on-line anti-theft alarm system configured in the vehicle is started, to send vehicle alarm information to a cloud end. However, in this case, if a lawless person performs signal interference near the vehicle by using an interferometer, the vehicle cannot communicate with the cloud end on a corresponding frequency, and the alarm information cannot be sent successfully.

Figure 1:
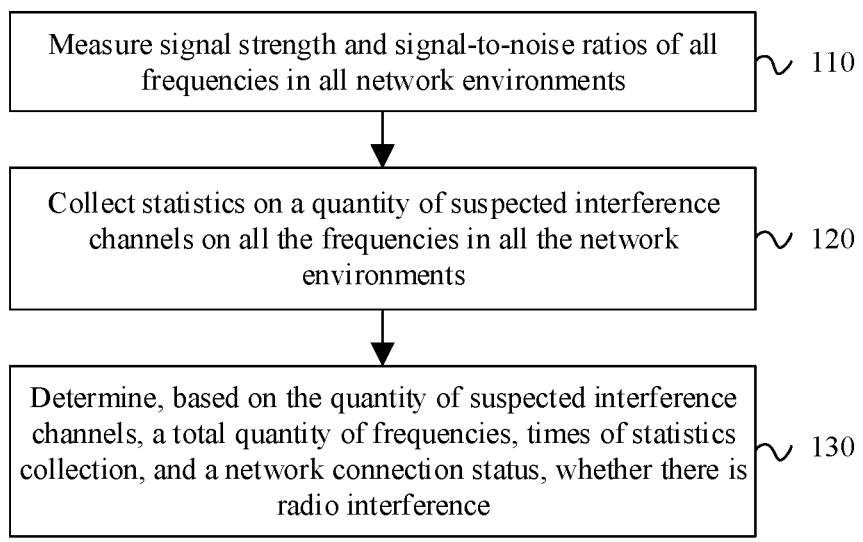
FIG. 1 is a flowchart of a radio interference detection method according to Embodiment 1 of this application.

FIG. 1 is a flowchart of a radio interference detection method according to an embodiment of this application. The method includes the following steps:

Step 110: Measure signal strength and signal-to-noise ratios of all frequencies in all network environments.

Step 120: Collect statistics on a quantity of suspected interference channels on all the frequencies in all the network environments.

The quantity of suspected interference channels is determined by using signal strength and a signal-to-noise ratio of a current frequency, and a determining manner may be as follows: If the signal strength of the current frequency is greater than a strength threshold and the signal-to-noise ratio of the current frequency is greater than a signal-to-noise ratio threshold, it is determined that there is interference on the current frequency, and the current frequency is determined as a suspected interference channel.

Step 130: Determine, based on the quantity of suspected interference channels, a total quantity of frequencies, times of statistics collection, and a network connection status, whether there is radio interference.

FIG. 2 is a schematic diagram of response duration of the detection method in FIG. 1 in global system for mobile communications.

For example, as shown in FIG. 2, a test environment is global system for mobile communications (GSM). Interference detection is performed by using the solution in FIG. 1, and a plurality of groups of test data is obtained through a plurality of times of practice. It can be learned from 12 tests that a detection time from when an interferometer is started to when a problem is found and reported is almost between 10 seconds and 20 seconds, and a detection time from when the interferometer is started to when the problem is found and reported and a network is disconnected is almost greater than 9 seconds. FIG. 3 is a schematic diagram of response duration of FIG. 1 in a long term evolution technology (LTE). Detection is performed in an LTE environment in FIG. 3, and a plurality of groups of experimental data is obtained through a plurality of times of practice and tests. It can be learned from 10 tests that an average time from when an interferometer is started to when interference is reported is 16.6 seconds, and all times are almost greater than 15 seconds. It can be found that interference detection consumes an excessively long time, and a response is slow.

Due to an excessively long interference detection time and a slow response, a report cannot be sent to an in-vehicle system in time, and protective measures cannot be performed on a vehicle in time, leading to a great decrease in security and practicability.

The embodiments of this application further provide a radio interference detection method and device. An available frequency is obtained by using information about a broadcast channel, signal strength of an available frequency of a current cell is scanned preferentially to determine whether there is radio interference, and if there is interference on the available frequency of the current cell, corresponding processing can be performed quickly. Because a relatively small quantity of frequencies are scanned preferentially, an effective interference detection speed can be increased quickly. Signal strength of a broadcast control channel (BCCH) of the current cell is measured. When signal strength of a current BCCH channel is less than a preset strength threshold or a network status is a connected state, all available frequencies of the current cell are obtained from the BCCH channel, and signal information of signals received on all the available frequencies of the current cell is measured. An available frequency is a frequency on which a terminal device can communicate with a cloud end. To ensure measurement accuracy, a plurality of times of measurement may be performed for each available frequency. When it is found through a plurality of times of measurement that the signal information of the signals received on all the available frequencies of the current cell is greater than a preset threshold, it is considered that currently, there is interference. When not all the signal information of the signals received on all the available frequencies is not greater than the preset threshold, a measurement range may be extended, to detect available frequencies in all network standards, and determine, based on a ratio of a quantity of frequencies on which there is interference to a total quantity of frequencies, whether there is interference. All the network standards may include a 2G network, a 3G network, a 4G network, a 5G network, and the like.

The solution of this application is described more clearly in the following embodiment by using an example in which a detection environment is GSM.

Figure 4:
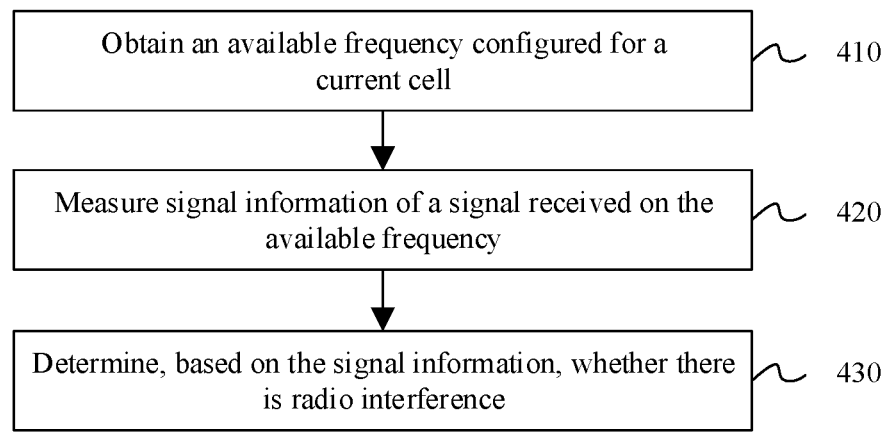
FIG. 4 is a flowchart of another radio interference detection method according to an embodiment of this application.

FIG. 4 is a flowchart of a radio interference detection method according to an embodiment of this application.

As shown in FIG. 4, the radio interference detection method includes the following steps. Step 410: Obtain an available frequency configured for a current cell.

Information about all available frequencies of the current cell is obtained from a BCCH channel of the current cell. The information about all the available frequencies is obtained from the BCCH channel of the current cell in a targeted manner, so that subsequent detection on an unnecessary frequency can be reduced, detection duration can be greatly shortened, and detection efficiency can be improved. For example, the available frequency that is configured for the current cell and that is obtained from the BCCH channel of the current cell may be, for example, GSM 900, GSM 1800, or the like.

Step 420: Measure signal information of a signal received on the available frequency.

Measurement is performed for all the available frequencies one by one, to detect signal information of a signal received on the frequency. The signal information may be signal strength of the signal, a signal-to-noise ratio of the signal, or the like. For example, measurement is performed for the obtained available frequencies GSM 900, GSM 1800, or the like one by one, to obtain frequency information corresponding to the frequency. For example, measurement is performed for a frequency in the selected GSM 900. After subsequent measurement for the frequency is completed, another frequency is selected for subsequent detection.

Step 430: Determine, based on the signal information, whether there is radio interference.

Figure 5:
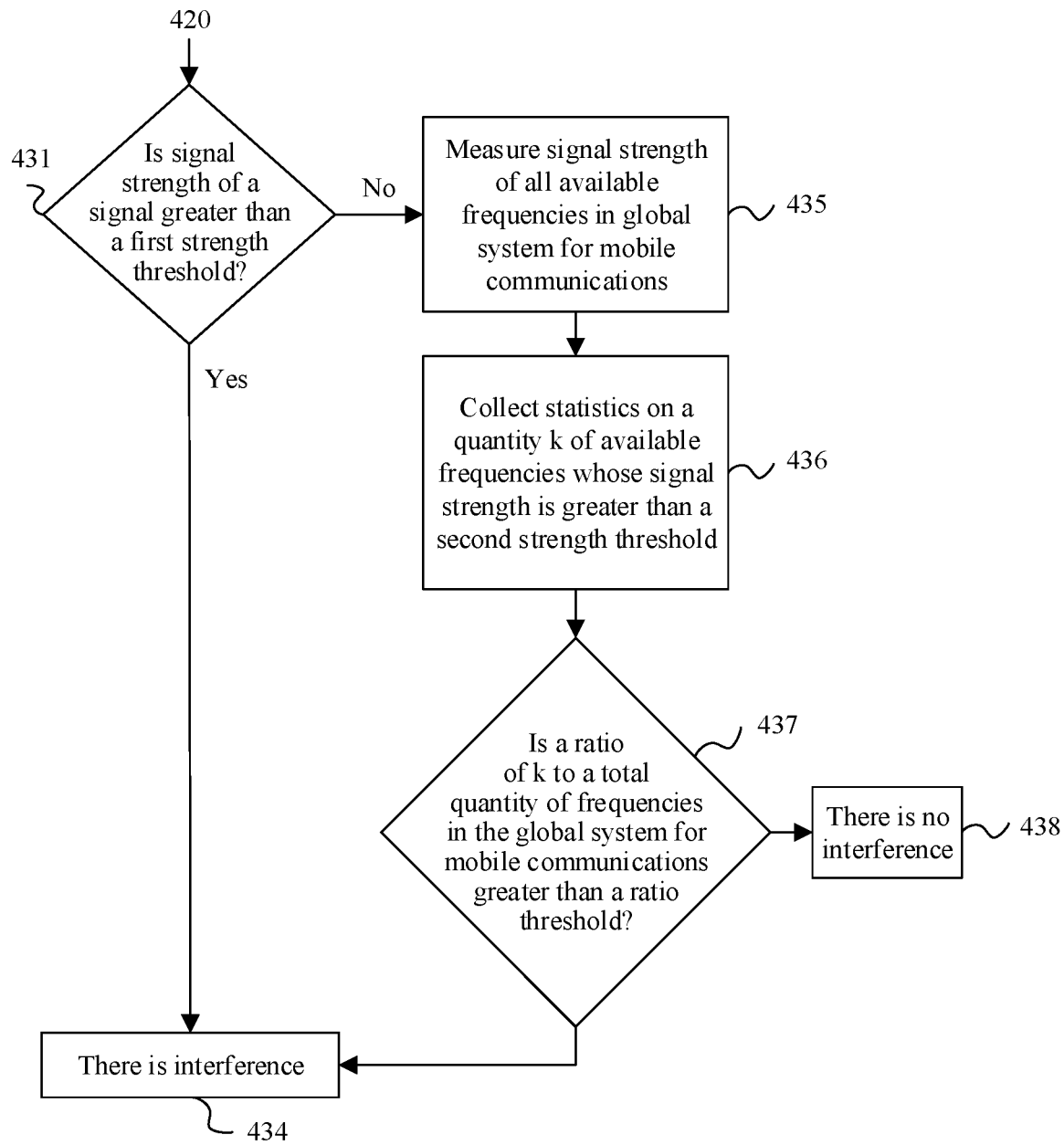
FIG. 5 is a flowchart of still another radio interference detection method according to an embodiment of this application.

As shown in FIG. 5, a radio interference detection method is provided by using an example in which the signal information is signal strength. Step 430 may further include the following steps. Step 431: Determine whether the signal strength of the signal received on the available frequency is greater than a first strength threshold, and when the signal strength of the signal is greater than the first strength threshold, perform step 434.

It should be noted by a person skilled in the art that because the signal strength is used as an example of the signal information, the first strength threshold is used as an example of the first signal threshold. In the following solution, correspondingly, a second strength threshold and a third strength threshold are respectively used as examples of a second signal threshold and a third signal threshold.

Step 434: Determine that there is interference on the current frequency.

When the signal strength of the signal received on the available frequency is greater than the first strength threshold, it is considered that there is an interfering signal on the current available frequency. In a normal case, when no alarm information is reported, there should be no signal on an available frequency, to ensure that there is no interference from another signal when alarm information is reported. In an example, signal strength of a current available frequency GSM 900 is measured. For example, a peak value of a signal detected on the current available frequency may be used as signal strength, and is compared with the first strength threshold, or a difference between a theoretical peak of a signal on the current available frequency and an actually detected peak of the signal may be used as signal strength, and is compared with the first strength threshold.

When it is determined in step 431 that the signal strength of the signal is not greater than the first strength threshold, the following steps may be further performed.

Step 435: Measure signal strength of all available frequencies in global system for mobile communications.

If no interference is found after scanning of the available frequency of the current cell is completed, a scanning scope may be further extended, to scan all the available frequencies in the GSM.

Step 436: Collect statistics on a quantity k of available frequencies whose signal strength is greater than the second strength threshold.

Step 437: Determine whether a ratio of k to a total quantity of frequencies in the global system for mobile communications is greater than a ratio threshold, and when the ratio of k to the total quantity of frequencies in the global system for mobile communications is greater than the ratio threshold, perform step 434 to determine that there is radio interference, or when the ratio is not greater than the ratio threshold, perform step 438 to determine that there is no radio interference.

After measurement for all the available frequencies of the current cell is completed, a range may be further extended to perform the measurement for all the available frequencies in the GSM. If no interference is detected after measurement for all the available frequencies of the current cell is completed, a detection range may be further extended, to perform the measurement for all the available frequencies in the GSM. It should be noted by a person skilled in the art that the GSM is merely an example, and other network standards may be further included, for example, LTE, CDMA, and WCDMA.

Then, statistics is collected on the total quantity of available frequencies whose strength thresholds are greater than the second strength threshold in the GSM, and the quantity may be marked as k. Then, the ratio of k to the total quantity of frequencies in the GSM is determined, to determine whether the ratio is greater than the ratio threshold. In an example, the ratio threshold may be a percentage threshold. In other words, a percentage, accounted for by the quantity k of frequencies on which there is interference, of the total quantity of frequencies in the GSM is determined. If the percentage reaches a percentage, it can be considered that currently, there is interference, or if the percentage does not reach the ratio threshold, it can be considered that there is no interference. In another example, the ratio threshold may be alternatively a decimal between 0 and 1. In an example, the ratio threshold may be preset to 80% or 0.8. If it is learned through statistics collection that the quantity k of all available frequencies whose strength thresholds are greater than the second strength threshold in the GSM is 62, and the total quantity of frequencies in the GSM, for example, 124 in GSM 900, the ratio thereof is 50% or 0.5, less than the preset ratio threshold, and it can be determined that there is no radio interference. If the detected k is 112, the ratio thereof is approximately 90% or 0.9, and it can be determined that there is radio interference.

It should be noted by a person skilled in the art that in FIG. 5, the signal strength of the signal is used as the signal information, but the signal information is not limited thereto, and the signal information may alternatively include a signal-to-noise ratio of the signal and the like.

Figure 6:
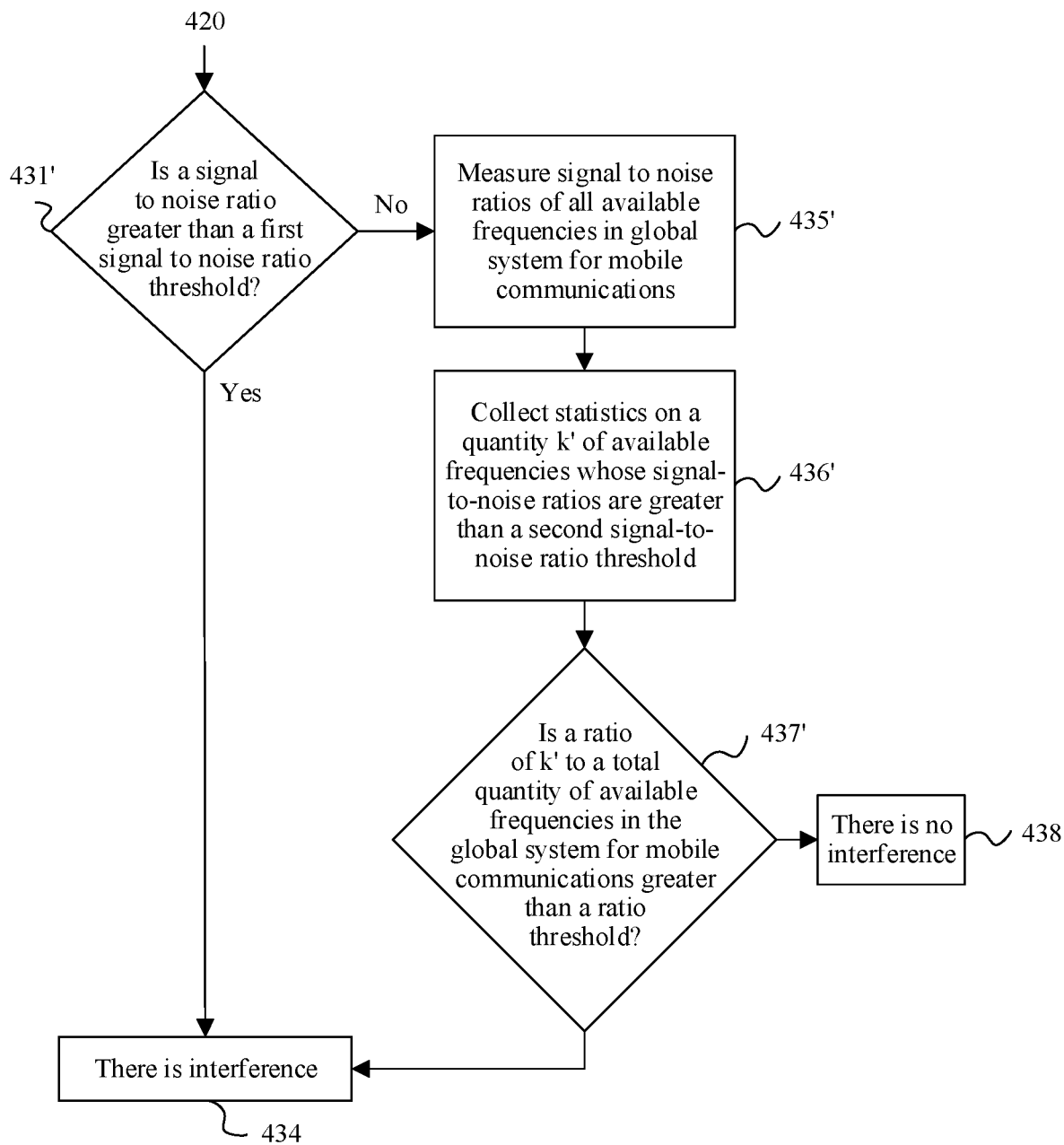
FIG. 6 is a flowchart of yet another radio interference detection method according to an embodiment of this application.

As shown in FIG. 6, another radio interference detection method is provided by using an example in which the signal information is a signal-to-noise ratio of the signal. The signal strength in FIG. 5 is replaced with the signal-to-noise ratio. The method includes the following steps. Step 431': Determine whether a signal-to-noise ratio of the signal received on the available frequency is greater than a first signal-to-noise ratio threshold, and when the signal-to-noise ratio of the signal is greater than the first signal-to-noise ratio threshold, perform step 434.

It should be noted by a person skilled in the art that because the signal-to-noise ratio is used as an example of the signal information, the first signal-to-noise ratio threshold is used as an example of the first signal threshold. In the following solution, correspondingly, a second signal-to-noise ratio threshold and a third signal-to-noise ratio threshold are respectively used as examples of a second signal threshold and a third signal threshold.

Step 434: Determine that there is interference on the current frequency.

When the signal-to-noise ratio of the signal received on the available frequency is greater than the first signal-to-noise ratio threshold, it is considered that there is an interfering signal on the current available frequency. Because in a normal case, there should be no signal on the available frequency when no alarm information is reported, a detected effective signal is definitely an interfering signal, and a larger signal-to-noise ratio of the interfering signal indicates a higher interfering signal. When the signal-to-noise ratio is greater than the preset first signal-to-noise ratio threshold, it can be determined that there is interference.

In an example, the first signal-to-noise ratio threshold may be preset to 30 dB. When it is detected that the signal-to-noise ratio of the current available frequency is 65 dB, it can be learned that the signal-to-noise ratio is greater than the first signal-to-noise ratio threshold, it can be determined that an effective signal on the current available frequency is relatively high, and this means that there is an interfering signal.

When it is determined in step 431' that the signal-to-noise ratio of the signal is not greater than the first signal-to-noise ratio threshold, the following steps may be further performed.

Step 435': Measure signal-to-noise ratios of all available frequencies in global system for mobile communications.

If no interference is found after scanning of the available frequency of the current cell is completed, a scanning scope may be further extended, to scan all the available frequencies in the GSM.

Step 436': Collect statistics on a quantity k' of available frequencies whose signal-to-noise ratios are greater than the second signal-to-noise ratio threshold.

Step 437': Determine whether a ratio of k' to a total quantity of frequencies in the global system for mobile communications is greater than a ratio threshold, and when the ratio of k to the total quantity of frequencies in the global system for mobile communications is greater than the ratio threshold, perform step 434 to determine that there is radio interference, or when the ratio is not greater than the ratio threshold, perform step 438 to determine that there is no radio interference.

Statistics is collected on the total quantity of available frequencies whose strength thresholds are greater than the second strength threshold in the GSM, and the quantity may be marked as k. Then, the ratio of k to the total quantity of frequencies in the GSM is determined, to determine whether the ratio is greater than the ratio threshold. In an example, the ratio threshold may be a percentage threshold. In other words, a percentage, accounted for by the quantity k of frequencies on which there is interference, of the total quantity of frequencies in the GSM is determined, and when the percentage reaches a percentage, it can be considered that currently, there is interference, or if the percentage does not reach the ratio threshold, it can be considered that there is no interference. In another example, the ratio threshold may be alternatively a decimal between 0 and 1.

In still another example, statistics may be collected on a quantity of suspected interference channels after signal strength of a frequency is detected, where the suspected interference channel is a channel whose signal strength is greater than a signal strength threshold and whose signal-to-noise ratio is greater than a signal-to-noise ratio threshold. Then, it is determined, through comprehensive analysis based on the quantity of suspected interference channels, a total quantity of channels of the current cell, times of measurement, a network connection status, and the like, whether there is interference.

Figure 7:
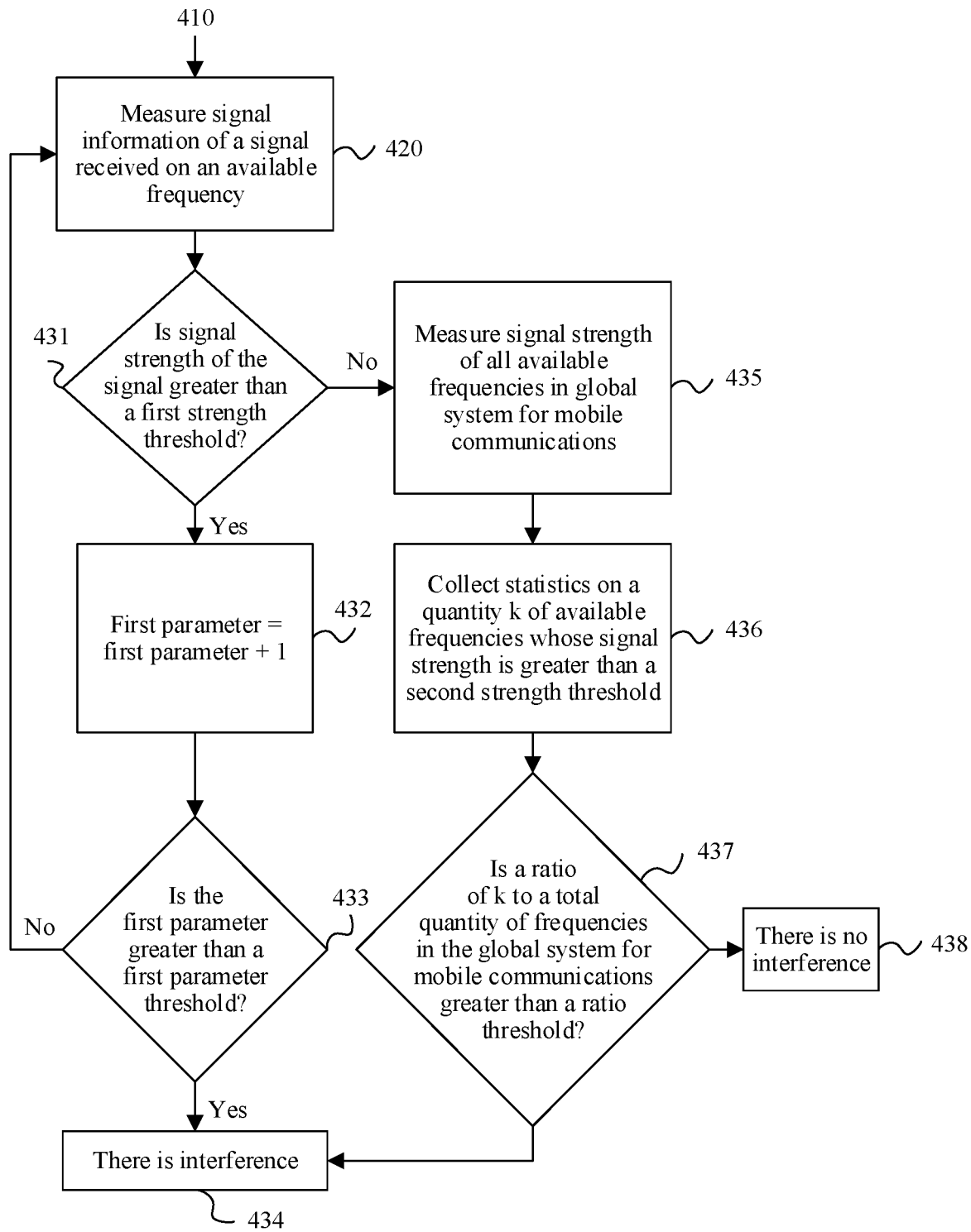
FIG. 7 is a flowchart of yet another radio interference detection method according to an embodiment of this application.
Figure 8:
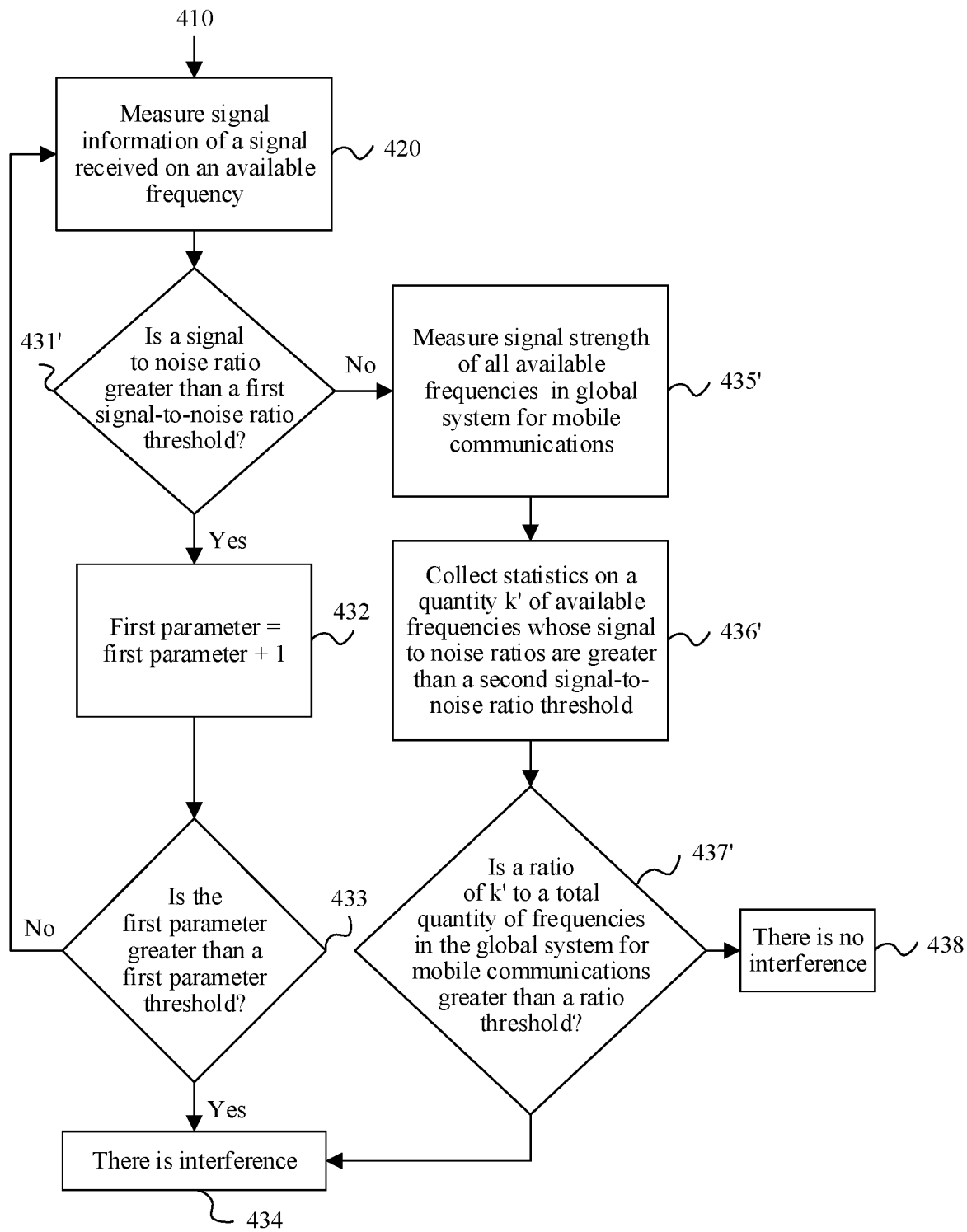
FIG. 8 is a flowchart of yet another radio interference detection method according to an embodiment of this application.

In an example, to ensure accuracy of frequency detection, repeated detection may be performed, so that after it is determined, for a plurality of times, that there is interference on a current frequency, it is determined that there is indeed interference on the current frequency. As shown in FIG. 7 and FIG. 8, for example, a first parameter may be set, to record a quantity of times of determining that there is interference on the current frequency. After step 431 and step 431', the method may further include the following steps. Step 432: Automatically add 1 to the first parameter. Step 433: Determine whether the first parameter is greater than a first parameter threshold, and if the first parameter is greater than the first parameter threshold, perform step 434, or if the first parameter is not greater than the first parameter threshold, perform step 420.

For example, the first parameter may be marked as N. Because the first parameter records the quantity of times of determining that there is interference on the current frequency, an initial value of N is set to 0. Then, measurement is performed for all available frequencies configured for the current cell, and then, it is determined whether signal strength of the available frequencies is greater than the first strength threshold or signal-to-noise ratios of the available frequencies are greater than the first signal-to-noise ratio threshold. When the signal strength is greater than the first strength threshold or the signal-to-noise ratios are greater than the first signal-to-noise ratio threshold, it can be considered that there is interference on the current frequency, and 1 is added to N to continue to measure signal strength of the frequency. When N is greater than the first parameter threshold, it is considered that there is indeed interference on the available frequency. The first parameter threshold is set based on an actual status, and a larger value indicates higher precision. For example, the first parameter threshold may be set to 10. In other words, after it is determined, through measurement for 10 times, that the signal strength of the available frequency is greater than the first strength threshold, it can be determined that currently, there is interference.

It should be noted by a person skilled in the art that in this application, 1 may be added to the first parameter before or after it is determined whether the first parameter is greater than the first parameter threshold. For example, the first parameter threshold is set to 10. If 1 is added to the first parameter before it is determined whether the first parameter is greater than the first parameter threshold, after it is detected, for 10 times, that there is interference on the frequency, it is determined that there is indeed interference. If 1 is added to the first parameter after it is determined whether the first parameter is greater than the first parameter threshold, after it is detected, for 11 times, that there is interference on the frequency, it is determined that there is indeed interference.

Figure 9:
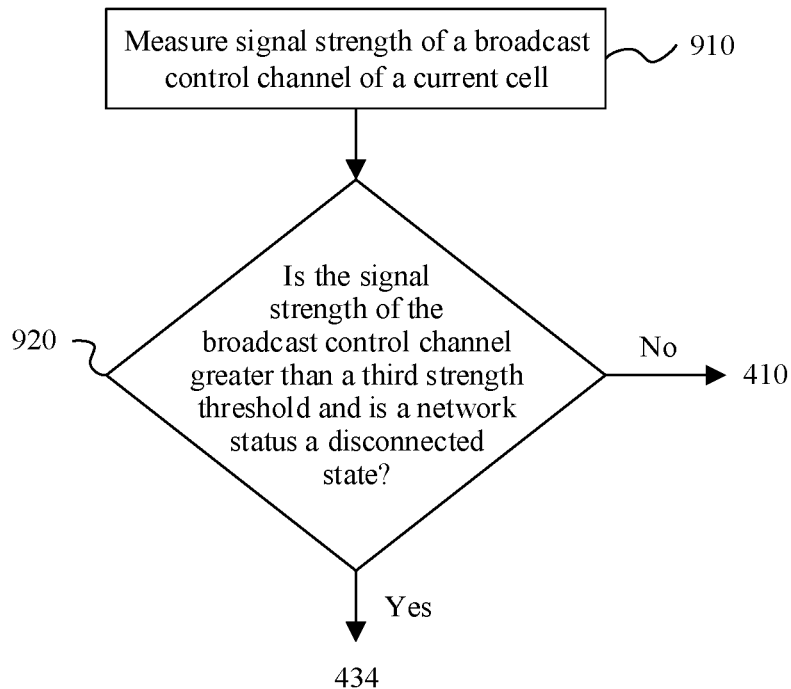
FIG. 9 is a flowchart of yet another radio interference detection method according to an embodiment of this application.

FIG. 9 is a flowchart of detecting the BCCH channel of the current cell according to this application.

In step 410, the available frequency configured for the cell may be obtained from the BCCH channel. To obtain the available frequency of the current cell, before step 410, the method may further include the following steps.

Step 910: Measure signal strength of the broadcast control channel of the current cell.

Step 920: Determine whether the signal strength of the broadcast control channel is greater than a third strength threshold and a network status is a disconnected state, and if the signal strength of the broadcast control channel is greater than the third strength threshold and the network status is the disconnected state, perform step 410, or if the signal strength of the broadcast control channel is not greater than the third strength threshold, or the network status is not the disconnected state, or the signal strength of the broadcast control channel is not greater than the third strength threshold and the network status is not the disconnected state, perform step 434.

In step 920, when the signal strength of the BCCH channel is greater than the third strength threshold, it can be determined that there is an interfering signal on the BCCH channel. However, if the network status is a connected state in this case, although there is interference on the BCCH channel, a subsequent series of behavior such as alarm reporting is not affected in this case. Therefore, interference on the BCCH channel does not affect alarm information reporting of a vehicle in this case, and subsequent interference detection can be performed. In another case, when the signal strength of the BCCH channel is not greater than the third strength threshold, it can be considered that there is no interference on the BCCH channel. However, if the network status is the disconnected state, for example, a device may be in an enclosed and isolated environment and is isolated from an external signal, although the device detects no interference on the BCCH channel, the network status is the disconnected state in this case, it cannot be simply considered that there is no interference in this case, and subsequent interference detection may further need to be performed. It can be directly determined, only when interference is detected on the BCCH channel and the network status is the disconnected state, that there is interference in a current environment.

Figure 10:
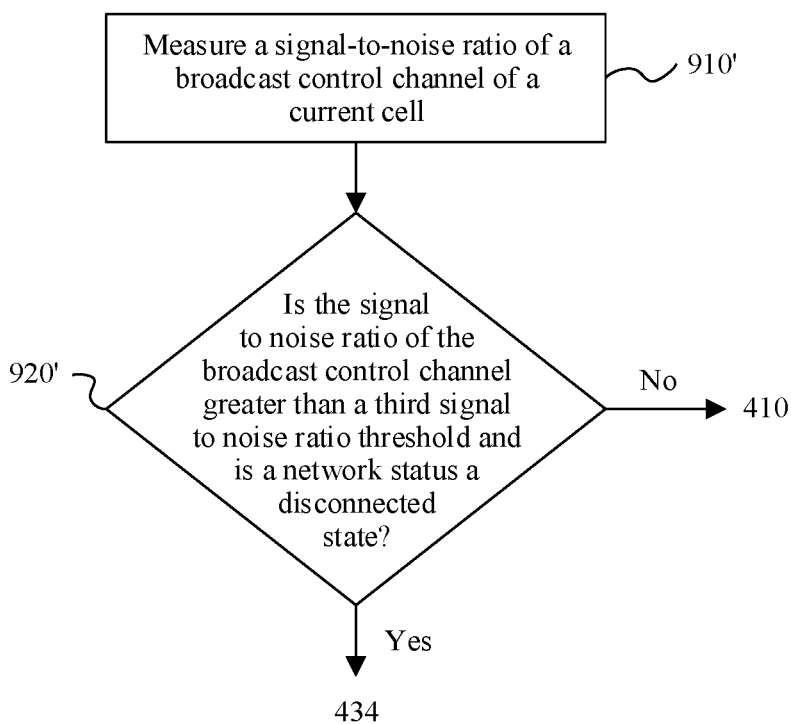
FIG. 10 is a flowchart of yet another radio interference detection method according to an embodiment of this application.

FIG. 10 is another flowchart of detecting the BCCH channel of the current cell according to this application.

In FIG. 9, the signal strength of the BCCH channel is detected to determine whether there is interference. It should be noted by a person skilled in the art that determining may be alternatively performed by using other information such as a signal-to-noise ratio. As shown in FIG. 10, the BCCH channel is detected in a manner of a signal-to-noise ratio.

Step 910': Measure a signal-to-noise ratio of the broadcast control channel of the current cell.

Step 920': Determine whether the signal-to-noise ratio of the broadcast control channel is greater than a third signal-to-noise ratio threshold and a network status is a disconnected state, and if the signal-to-noise ratio of the broadcast control channel is greater than the third signal-to-noise ratio threshold and the network status is the disconnected state, perform step 410, or if the signal-to-noise ratio of the broadcast control channel is not greater than the third signal-to-noise ratio threshold, or the network status is not the disconnected state, or the signal-to-noise ratio of the broadcast control channel is not greater than the third signal-to-noise ratio threshold and the network status is not the disconnected state, perform step 434.

Figure 11:
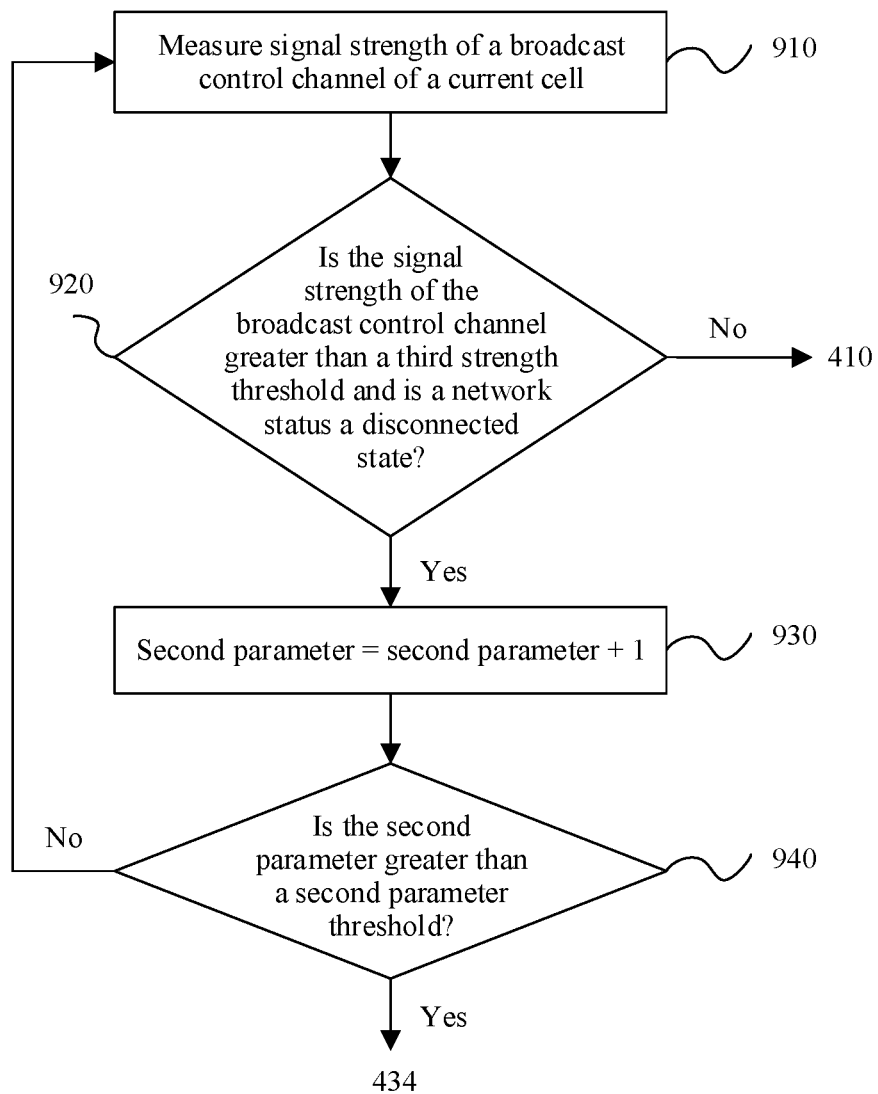
FIG. 11 is a flowchart of yet another radio interference detection method according to an embodiment of this application.
Figure 12:
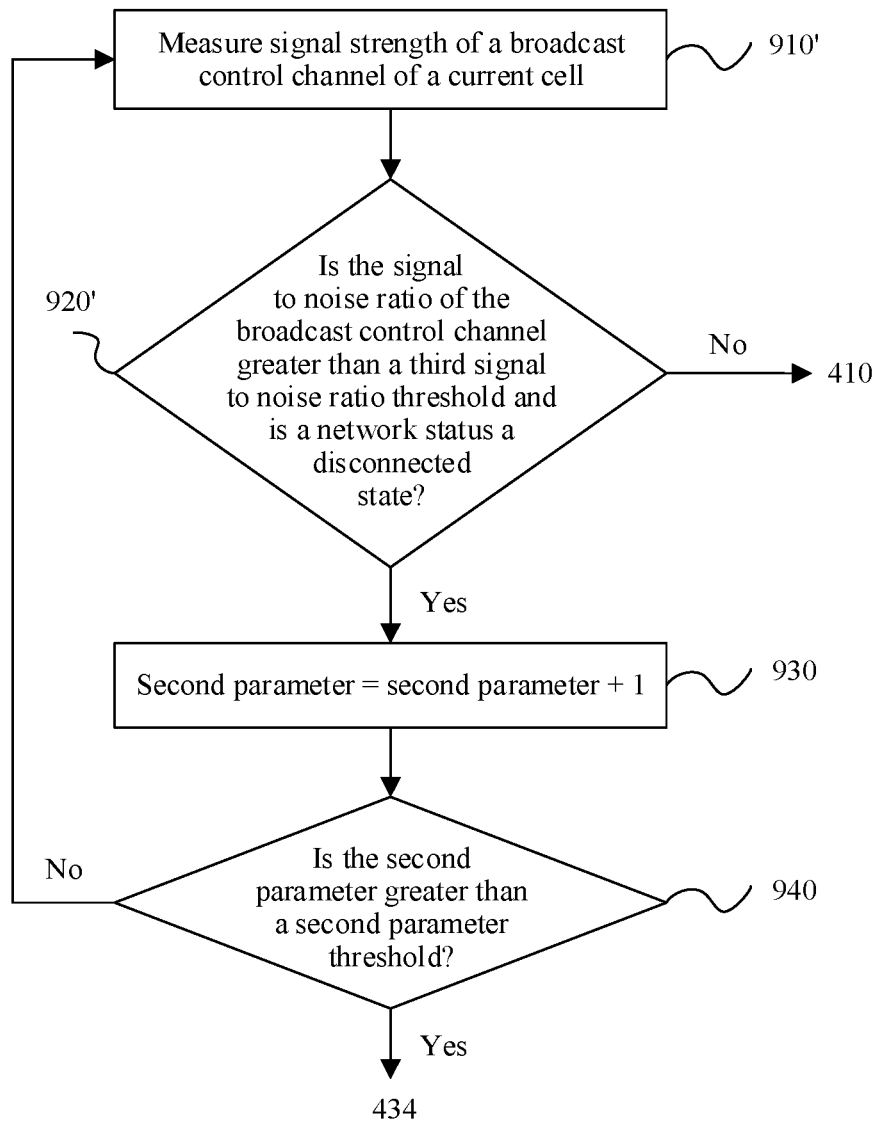
FIG. 12 is a flowchart of yet another radio interference detection method according to an embodiment of this application.

In an example, to ensure accuracy of BCCH channel detection, repeated detection may be performed, so that after it is determined, for a plurality of times, that there is interference on the BCCH channel, it is determined that there is indeed interference on the current frequency. As shown in FIG. 11 and FIG. 12, for example, a second parameter may be set, to record a quantity of times of determining that there is interference on the current frequency. After step 920 and step 920', the method may further include the following steps. Step 930: Automatically add 1 to the second parameter. Step 940: Determine whether the second parameter is greater than a second parameter threshold, and if the second parameter is greater than the second parameter threshold, perform step 434, or if the second parameter is not greater than the second parameter threshold, perform step 910.

In an example, to obtain information about an available frequency from the BCCH channel of the current cell, first, the BCCH channel needs to be detected, to detect whether there is interference on the BCCH channel. Therefore, in this application, before measurement is performed for all the available frequencies of the current cell, the BCCH channel of the current cell and a network connection status are measured first. 1 is added to the second parameter when it is detected that the signal strength of the BCCH channel of the current cell is greater than the third strength threshold and the network status is the disconnected state or when it is detected that the signal-to-noise ratio of the BCCH channel of the current cell is greater than the third signal-to-noise ratio threshold and the network status is the disconnected state. For example, the second parameter may be set to M. When it is detected that the signal strength of the BCCH channel of the current cell is greater than the third strength threshold and the network status is the disconnected state or when it is detected that the signal-to-noise ratio of the BCCH channel of the current cell is greater than the third signal-to-noise ratio threshold and the network status is the disconnected state, 1 is added to M, and then it is determined whether M is greater than the second parameter threshold. In an example, a third parameter threshold may be set to 10. In other words, after it is determined, through measurement for 10 times, that there is interference on the BCCH channel of the current cell and the network status is the disconnected state, it can be determined that currently, there is indeed interference. If M is less than the second parameter threshold, the BCCH channel of the current cell is detected.

It should be noted by a person skilled in the art that in this application, 1 may be added to the second parameter before or after it is determined whether the second parameter is greater than the second parameter threshold. For example, the second parameter threshold is set to 10. If 1 is added to the second parameter before it is determined whether the second parameter is greater than the second parameter threshold, after it is detected, for 10 times, that there is interference on the BCCH channel, it is determined that there is indeed interference. If 1 is added to the second parameter after it is determined whether the second parameter is greater than the second parameter threshold, after it is detected, for 11 times, that there is interference on the BCCH channel, it is determined that there is indeed interference.

It should be further noted by a person skilled in the art that the first parameter and the second parameter in FIG. 7, FIG. 8, FIG. 11, and FIG. 12 are merely used for differentiation, and there is no logical sequence between the first parameter and the second parameter. In addition, to ensure accurate detection, before the method is performed, initial values of the first parameter and the second parameter should be set to 0, to ensure accuracy of repeated detection.

In addition, during detection in this application, a detected frequency may be understood as some frequencies in a frequency band, the frequency band may be understood as including a plurality of frequencies, and a plurality of frequencies in a range form a frequency band. In addition, during actual detection, after information about a frequency is obtained, a frequency corresponding to a current frequency can be learned immediately based on a correspondence between a frequency and a frequency, and then, information such as signal strength or a signal-to-noise ratio on the frequency is measured.

Figure 13:
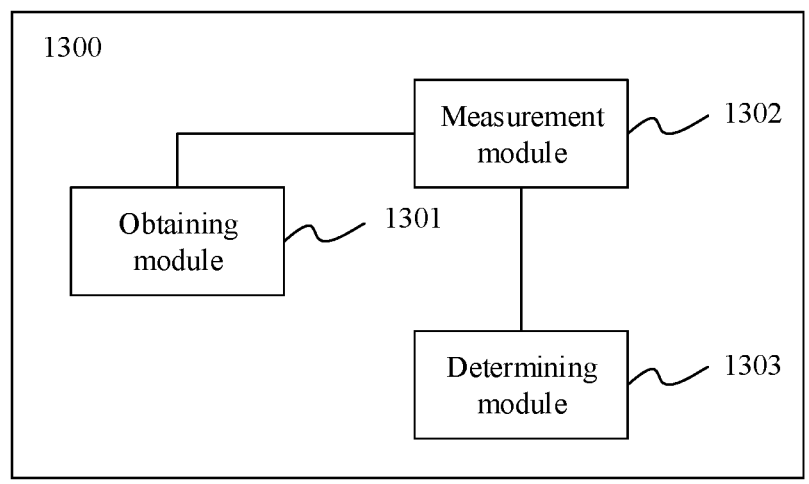
FIG. 13 is a schematic diagram of a radio interference detection apparatus according to an embodiment of this application.

FIG. 13 is a schematic diagram of a radio interference detection apparatus according to an embodiment of this application.

As shown in FIG. 13, this application provides a radio interference detection apparatus 1300, including: an obtaining module 1301, configured to obtain an available frequency configured for a current cell; a measurement module 1302, configured to measure signal information of a signal received on the available frequency; and a determining module 1303, configured to determine, based on the signal information of the signal, whether there is radio interference.

The signal information includes signal strength or a signal-to-noise ratio.

The determining module 1303 is configured to: when the signal information of the signal is greater than a first information threshold, automatically add 1 to a first parameter, and determine whether the first parameter is greater than a first parameter threshold, where the first parameter records a quantity of times that the signal information of the signal is greater than the first information threshold, and an initial value of the first parameter is 0; and when the first parameter is greater than the first parameter threshold, determine that there is radio interference.

The determining module 1303 is further configured to: when the first parameter is not greater than the first parameter threshold, the measurement module continues to measure the signal information of the signal received on the available frequency.

The measurement module 1302 is further configured to: when the signal information of the signal is not greater than the first information threshold, measure signal information of all available frequencies in all network standards; and the determining module 1303 is further configured to: collect statistics on a quantity k of available frequencies with signal information being greater than a second information threshold; determine whether a ratio of k to a total quantity of frequencies in all the network standards is greater than a ratio threshold; and when the ratio of k to the total quantity of frequencies in all the network standards is greater than the ratio threshold, determine that there is radio interference.

The determining module 1303 is further configured to: when the ratio of k to the total quantity of frequencies in all the network standards is not greater than the ratio threshold, determine that there is no radio interference.

The measurement module 1302 is further configured to measure signal information of a broadcast control channel of the current cell; and the determining module 1303 is further configured to: when the signal information of the broadcast control channel is not greater than a third information threshold or a network status is a connected state, obtain, from the broadcast control channel of the current cell, the available frequency configured for the current cell.

The determining module 1303 is further configured to: when the signal information of the broadcast control channel is greater than the third information threshold and the network status is a disconnected state, automatically add 1 to a second parameter, and determine whether the second parameter is greater than a second parameter threshold, where the second parameter records a quantity of times that the signal information of the broadcast control channel is greater than the third information threshold and the network status is the disconnected state, and an initial value of the second parameter is 0; and when the second parameter is greater than the second parameter threshold, determine that there is radio interference on the broadcast control channel.

The determining module 1303 is further configured to: when the second parameter is not greater than the second parameter threshold, measure the signal information of the broadcast control channel of the current cell.

This application provides a computer readable storage medium, including an instruction. When the instruction is run on a computer, the computer is enabled to perform the method in any one of FIG. 4 to FIG. 12.

This application provides a computer program product including an instruction. When the computer program product is run on a computer, the computer is enabled to perform the method in any one of FIG. 4 to FIG. 12.

In the radio interference detection method and device provided in the present invention, an available frequency is obtained by using information about a broadcast channel, signal strength of the available frequency of the current cell is scanned preferentially to determine whether there is radio interference, and if there is interference on the available frequency of the current cell, corresponding processing can be performed quickly. Because a relatively small quantity of frequencies are scanned preferentially, and corresponding radio interference detection can be completed approximately within 1 s, an effective interference detection speed can be increased quickly.

It should be noted by a person skilled in the art that in addition to 2G, 3G, and 4G, this application may be further applied to another network connected based on a broadcast mechanism, to perform interference detection, for example, Wi-Fi. In addition, for a 5G network, it is learned from an existing protocol released by the 3rd generation partnership project (3GPP), a basic multiple access manner is still an orthogonal frequency division multiplexing technology (OFDM), and is based on the broadcast mechanism. Similar to LTE, the detection solution may also be applied to the 5G network.

In an example, for example, in a 3G network, an available frequency is obtained by using a BCCH channel, a corresponding frequency such as 2100 MHz can be learned based on the available frequency, and then, information such as signal strength or a signal-to-noise ratio on the frequency such as 2100 MHz is measured, to determine whether there is signal interference. For another example, in a 4G network, an available frequency is obtained by using a BCCH channel, a corresponding frequency such as 2600 MHz can be learned based on the available frequency, and then, information such as signal strength or a signal-to-noise ratio on the frequency such as 2600 MHz is measured, to determine whether there is signal interference. For another example, in a 5G network, an available frequency is obtained by using a BCCH channel, a corresponding frequency such as 3.5 GHz or 3.7 GHz can be learned based on the available frequency, and then, information such as signal strength or a signal-to-noise ratio on the frequency such as 3.5 GHz or 3.7 GHz is measured, to determine whether there is signal interference.

A person skilled in the art should be aware that in the foregoing one or more examples, functions described in the embodiments of this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A radio interference detection method performed by a radio interference detection apparatus for a vehicle, wherein the method comprises:
   obtaining information about all available frequencies configured for a current cell from a broadcast control channel (BCCH) by measuring each of the available frequencies, one by one, to detect signal information of a signal received on the respective frequency,
   wherein, based on the signal information being not greater than a third information threshold, obtaining from the BCCH of the current cell one of the available frequencies configured for the current cell; and determining, based on the signal information, whether there is radio interference.

2. The method of claim 1, wherein the signal information comprises signal strength.

3. The method of claim 1, wherein the signal information comprises a signal-to-noise ratio.

4. The method according to claim 1, wherein determining whether there is radio interference comprises determining there is radio interference in response to the signal information of the signal being greater than a first information threshold.

5. The method according to claim 4, further comprising:
measuring signal information of the signal received on all available frequencies in all network standards in response to the signal information of the signal being not greater than the first information threshold;
collecting statistics on a quantity k of available frequencies with signal information being greater than a second information threshold; and
determining whether a ratio of k to a total quantity of frequencies in all the network standards is greater than a ratio threshold, and determining that there is radio interference in response to the ratio of k to the total quantity of frequencies in all the network standards being greater than the ratio threshold.

6. The method according to claim 5, wherein in response to the ratio of k to the total quantity of frequencies in all the network standards being not greater than the ratio threshold, determining there is no radio interference.

7. The method according to claim 1, further comprising:
determining there is radio interference on the BCCH in response to the signal information being greater than the third information threshold and a network status being a disconnected state.

8. A radio interference detection apparatus comprising:
a processor; and
a memory coupled to the processor and having processor-executable instructions stored thereon, which when executed by the processor cause the apparatus to implement operations including:
obtaining information about all available frequencies configured for a current cell from a broadcast control channel (BCCH) by measuring each of the available frequencies, one by one, to detect signal information of a signal received on the respective frequency,
wherein, based on the signal information being not greater than a third information threshold, obtaining from the BCCH of the current cell one of the available frequencies configured for the current cell; and
determining, based on the signal information, whether there is radio interference.

9. The apparatus according to claim 8, wherein the signal information comprises signal strength.

10. The apparatus according to claim 8, wherein the signal information comprises a signal-to-noise ratio.

11. The apparatus according to claim 8, wherein the operations further include determining that there is radio interference in response to the signal information of the signal being greater than a first information threshold.

12. The apparatus according to claim 11, wherein the operations further include:
measuring signal information of all available frequencies in all network standards in response to the signal information of the signal being not greater than the first information threshold;
collecting statistics on a quantity k of available frequencies with signal information being greater than a second information threshold;
determining whether a ratio of k to a total quantity of frequencies in all the network standards is greater than a ratio threshold; and
determining that there is radio interference in response to the ratio of k to the total quantity of frequencies in all the network standards being greater than the ratio threshold.

13. The apparatus according to claim 12, wherein the operations further include: determining that there is no radio interference in response to the ratio of k to the total quantity of frequencies in all the network standards being not greater than the ratio threshold.

14. The apparatus according to claim 8, wherein the operations further include:
determining that there is radio interference on the BCCH in response to the signal information being greater than the third information threshold and a network status being a disconnected state.

15. A non-transitory computer-readable storage medium comprising processor-executable instructions, which when executed by a processor of a radio interference detection apparatus cause the apparatus to implement operations including:
obtaining information about all available frequencies configured for a current cell from a broadcast control channel (BCCH) by measuring each of the available frequencies, one by one, to detect signal information of a signal received on the respective frequency,
wherein, based on the signal information being not greater than a third information threshold, obtaining from the BCCH of the current cell one of the available frequencies configured for the current cell; and
determining, based on the signal information, whether there is radio interference.

16. The non-transitory computer-readable storage medium of claim 15, wherein the signal information comprises signal strength.

17. The non-transitory computer-readable storage medium of claim 15, wherein the signal information comprises a signal-to-noise ratio.

18. The non-transitory computer-readable storage medium of claim 15, wherein determining whether there is radio interference comprises determining there is radio interference in response to the signal information of the signal being greater than a first information threshold.

19. The non-transitory computer-readable storage medium of claim 18, wherein the operations further comprise:
measuring signal information of the signal received on all available frequencies in all network standards in response to the signal information of the signal being not greater than the first information threshold;
collecting statistics on a quantity k of available frequencies with signal information being greater than a second information threshold; and
determining whether a ratio of k to a total quantity of frequencies in all the network standards is greater than a ratio threshold, and determining that there is radio interference in response to the ratio of k to the total quantity of frequencies in all the network standards being greater than the ratio threshold.

20. The non-transitory computer-readable storage medium of claim 15, wherein the operations further comprise:
  determining there is radio interference on the BCCH in response to the signal information being greater than the third information threshold and a network status being a disconnected state.

* * * * *